United States Patent [19]

Bourke

[11] 4,346,691
[45] Aug. 31, 1982

[54] SLAB-GRIPPING APPARATUS

[76] Inventor: Patrick T. Bourke, Doon House, Maam, County Galway, Ireland

[21] Appl. No.: 64,999

[22] Filed: Aug. 7, 1979

Related U.S. Application Data

[60] Division of Ser. No. 848,352, Nov. 3, 1977, which is a continuation-in-part of Ser. No. 686,213, May 12, 1976, Pat. No. 4,063,982, which is a continuation-in-part of Ser. No. 394,138, Sep. 4, 1973, Pat. No. 3,963,846.

[51] Int. Cl.³ .............................................. B28D 1/02
[52] U.S. Cl. ........................................ 125/12; 83/152; 125/35; 269/21
[58] Field of Search ............................. 269/21, 239, 71; 214/15; 125/35, 12, 13 R, 13 SS; 51/283, 235; 83/152

[56] References Cited

U.S. PATENT DOCUMENTS

| | | | |
|---|---|---|---|
| 1,220,108 | 3/1917 | Heckathorn | 269/239 X |
| 2,019,789 | 11/1935 | Mahannah | 269/71 |
| 2,177,967 | 10/1939 | Watkins | 269/21 |
| 3,207,503 | 9/1965 | Clover | 269/21 |
| 3,467,075 | 9/1969 | Cary | 125/13 R |

FOREIGN PATENT DOCUMENTS 1387590 3/1975 United Kingdom .................. 83/152

Primary Examiner—Harold D. Whitehead
Attorney, Agent, or Firm—Young & Thompson

[57] ABSTRACT

Apparatus for gripping slabs of stone and supporting the slab on its edge while it is cut into two planar laminae, comprises grippers in the form of oppositely arranged vacuum-operated suction cups which grip opposite faces of the slab to prevent relative movement of the partly-cut stone laminae during cutting thereof. One of the grippers is mounted for bodily vertical swinging movement toward and away from the slab about an axis disposed no higher than the lower edge of the slab.

8 Claims, 3 Drawing Figures

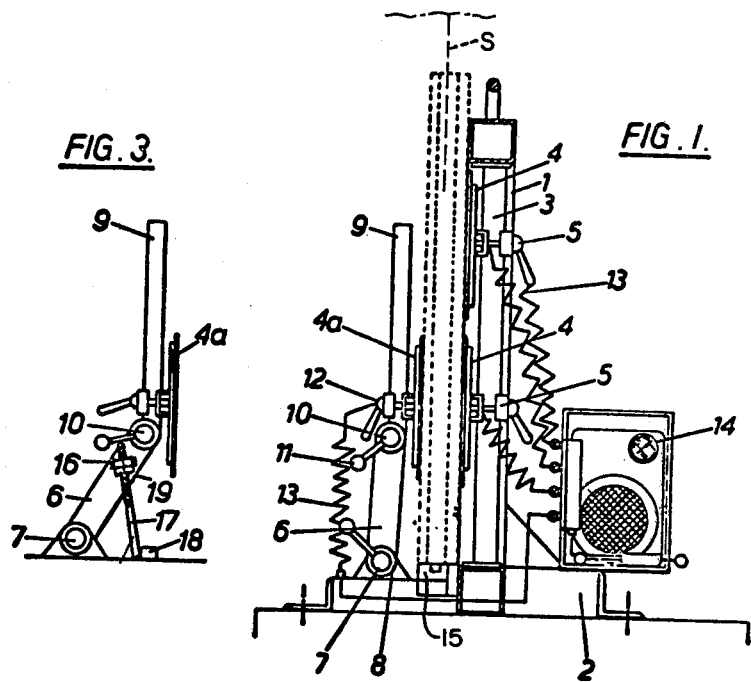
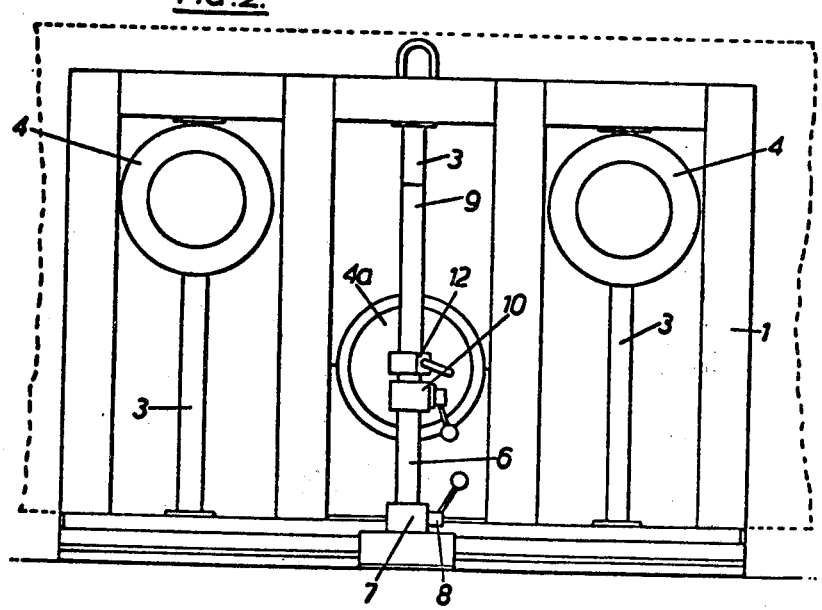

SLAB-GRIPPING APPARATUS

BACKGROUND OF THE INVENTION

This invention concerns apparatus for the construction of composite surface elements, such as tiles and panels, having a natural stone facing and is a division of application Ser. No. 848,352, filed Nov. 3, 1977, which in turn was a continuation-in-part of application Ser. No. 686,213, filed May 12, 1976, and now U.S. Pat. No. 4,063,982, which in turn was a continuation-in-part of my application Ser. No. 394,138, filed Sept. 4, 1973 and now U.S. Pat. No. 3,963,846. Such elements are intended for use, for example, in the cladding of walls, ceilings or other surface, in the manufacture of furniture, and for all purposes where natural stone surfaces are required.

Natural stone, such as marble, is an exquisite surfacing material on account of its hardness and durability, its beauty of structure and the high polish which can usually be imparted to it, but its use is greatly restricted by reason of its weight and expense, since the material is liable to fracture if not of a certain thickness, depending upon the handling and usage to which it may require to be subjected. These drawbacks are overcome by the invention the subject of my U.S. Pat. No. 3,723,233 which describes a method of preparing a stone-faced composite surface element having a lamina of stone bonded to a backing sheet comprising adhesively bonding to the surface of a stone slab a backing sheet of light-weight multicellular material of substantially greater thickness than said lamina, and thereafter sawing off a portion of said slab to leave a thin marble lamina adhered to said sheet of multicellular material. As the backing sheet supports the lamina when it is being cut, the risk of cracking the lamina is reduced and remarkably thin stone laminae of the order of between 2 and 5 mm in thickness, may be obtained. Preferably, in carrying out the aforesaid method a large block of stone is first cut into a number of slabs which are of the order of 20 to 25 mm in thickness. The slabs are dried and a light-weight backing sheet is bonded to each of the two opposite faces of the slab. The slab is then sawed in two along a cutting plane substantially parallel to and midway between said faces to leave a thin layer of stone attached to each backing sheet. In one method a plurality of slabs, with backing sheets attached, are firmly clamped together in parallel relation, and the slabs are each cut in two, as described above, using a gang saw. A central planar section of each slab, of a width greater than half the thickness of the slab, is pulverized by the saw blade during the sawing operation. Thus, it will be appreciated that as the saw moves down through the slabs a gap having a width of between, say 12 and 17 mm in thickness, is left between the partly-cut stone layers. Because of the inward pressure exerted by the clamps the partly-cut stone layers are pushed towards each other which causes cracking of the layers. Furthermore, considerable pressure is exerted on the saw blade which prevents a smooth cut from being obtained. The aforesaid disadvantages are overcome by the invention the subject of my U.S. Pat. No. 4,063,982 which describes and claims a method of manufacturing composite surface elements each comprising a lamina of natural facing stone bonded by adhesive to a backing sheet consisting of a core of light-weight sheet material which is resistant to compressive forces in a direction substantially normal to the plane of the sheet, comprising the steps of:

(i) cutting a block of natural facing stone into a number of slabs, two opposite faces of which are substantially parallel and each of which has a thickness greater than twice the thickness of the desired lamina;

(ii) drying the cut slabs;

(iii) applying and bonding to each of the two opposed faces of each stone slab a backing sheet comprising a core of light-weight sheet material which is resistant to compressive forces in a direction substantially normal to the plane of the sheet;

(iv) positioning each slab, with the backing sheets attached to the opposite faces thereof, between oppositely arranged vacuum-operated suction cups;

(v) applying suction to the cups to hold the slab rigidly in position therebetween;

(vi) sawing the slab in two along a cutting plane substantially parallel to and midway between said faces to leave a thin stone layer adhered to each said backing sheet, and during said sawing maintaining said suction to prevent relative movement of the partly-cut stone layers; and (vii) before or after the sawing step bonding a skin of sheet material of greater tensile strength than the backing sheet to the surface of the core opposite the stone lamina.

The present invention provides apparatus for use in the aforesaid method.

SUMMARY OF THE INVENTION

According to the invention apparatus for use in supporting stone slabs during a sawing operation comprises first gripping means in the form of at least one vacuum-operated suction cup, second gripping means in the form of at least a second vacuum-operated suction cup disposed in opposed spaced relation to said first suction cup, such that a stone slab may be positioned between said suction cups, means for applying suction to each of the cups such that said first cup is adapted to grip one face of the slab while the second suction cup is adapted to grip the opposite face of the slab.

One embodiment of the apparatus of the invention is described hereinafter with reference to the accompanying drawings, wherein:

FIG. 1 is a side elevation of support apparatus;

FIG. 2 is a front elevation of the apparatus shown in FIG. 1, and

FIG. 3 is a side elevation of a modification of the apparatus shown in FIG. 1.

Referring to the drawings, the apparatus comprises an upright frame member 1 supported on a stand 2. The frame member 1 is provided with three tubular supports 3, which are arranged vertically in the frame member and are parallel to each other. A vacuum-operated suction cup 4 is mounted on each support 3 and is movable vertically along the support. A clamp member 5 is provided on each suction cup 4 to lock the suction cup in position at a desired location on the support 3. A tilting arm 6 is pivotally connected by a pivot 7 to the stand 2 at a position opposite to, but spaced from, the frame member 1. The tilting arm 6 is provided with a clamp member 8 which serves to lock the arm in a desired position. A tubular support 9 is hingedly connected to the end of the tilting arm by means of a pivot 10. The pivot 10 is provided with a clamp member by means of which the tubular support 9 can be locked relative to the arm 6. A vacuum-operated suction cup 4a is mounted on the support 9 and is movable vertically along the support. The cup 4a can be locked in position at a desired location by means of a clamp member 12. The suction cups 4 and 4a are connected by suitable tubing 13 to a vacuum pump 14.

In its upright position shown in phantom line in FIG. 1, the slab rests on its lower edge on the upper surface of a support 15 comprising part of stand 2. The lower edge of the slab in this position, as determined by the level of the upper or supporting surface of support 15, is at least about as high as the horizontal axis of bodily vertical swinging movement of cup 4a as determined by pivot 7.

In operation of the device, a slab of facing stone which has been provided on opposite faces with a backing, as described above, is positioned on its edge on support 15 in an upright position between the frame member 1 and the tilting arm 6. The suction cups 4 are suitably positioned on the tubular support 3 having regard to the height of the slab. The clamps 8 and 9 are opened and the arm 6 and support 9 are tilted relative to each other until the suction cup 4a is parallel to and in contact with the outer surface of the slab. The cup 4a is preferably positioned about midway up the slab. The clamps 5, 8, 9 and 10 are then locked and suction is applied to the cups 4 and 4a to hold the composite element rigidly in position. The circular saw S is then moved into position and cuts the slab down the middle as described above. The clamps 8 may then be opened and the composite element which is left attached to the suction cup 4a can then be moved from the outer element, which is supported by the suction cups 4, by tilting the support 9 outwardly until the slab element is held horizontally. Because the supported lower edge of the slab is at least about as high as the horizontal axis about which the slab element swings away from the outer element which remains supported in vertical position by the suction cups 4, there will be no or substantially no movement of the lower edge of the vertically swinging slab element toward the other slab element and hence no interference between the severed slab elements such as would prevent this tilting of the support 9. Vacuum to the cup 4a may then be disconnected. Preferably, there are separate vacuum controls for all of the cups 4, 4a so that they can be disconnected separately from the vacuum source.

The slab of stone before cutting is suitably of a thickness of the order of 20 to 25 mm. About 12 to 17 mm of the stone is lost in the cutting, depending upon the thickness of the saw blade, and so the resultant laminae are each about 4 mm in thickness, and a further 1 mm of each lamina is lost in polishing and grinding so that the final composite surface elements each have a lamina of stone of about 3 mm in thickness.

It will be appreciated that a number of modifications may be made to the gripping device without departing from the scope of the invention. For example, the support arm 9 may be provided with two suction cups 4a which may be mounted on a horizontally extending arms so as to provide for horizontal adjustment of the cups. Furthermore, means may be provided for longitudinal adjustment of the tilting arm 6. Furthermore, the number of suction cups on the frame member 1 can be altered to suit the size of panels. Means may also be provided to ensure that the cups 4 are kept coplanar with the frame 1 so as to prevent bowing of the panel.

As mentioned previously, the function of the vacuum cups 4, 4a is to hold the slab rigidly during sawing without applying any substantial inwardly-directed pressure. Thus, it is important to ensure, when applying and locking the cup 4a in position against the slab, that it is not pressed too tightly inwards. This can be avoided by using the modification shown in FIG. 3. In this modification the clamp member 8 is dispensed with. Instead the tilting arm 6 is provided with a nut 16 or the like, which is welded or otherwise secured to the arm 6. The nut 16 receives, in screw engagement, a threaded rod 17 which, when the arm is positioned as shown in FIG. 3, rests against a stop 18. Thus the maximum inward tilt of the arm 6 can be predetermined by suitably adjusting the projecting length of the rod 17. The rod 17 can be secured in a desired position by means of a lock nut 19.

I claim:

1. In combination with a stone-cutting saw, slab-gripping apparatus comprising first gripping means in the form of at least one vacuum-operated suction cup, an upright frame on which said cup is mounted in a substantially vertical position, second gripping means in the form of at least a second vacuum-operated suction cup disposed in opposed relation to said first suction cup, means for supporting a stone slab on its edge between said cups with one face of the slab in contact with said first gripping means and the lower edge of the slab supported on said supporting means, articulated support means for said second suction cup whereby the cup may be swung into a position in which it is in contact with the opposite face of the slab, and means for supplying suction to each of the cups such that said first cup is adapted to grip one face of the slab while the second suction cup is adapted to grip the opposite face of the slab, the saw and slab-gripping apparatus being so positioned relative to each other that the blade of the saw cuts along a cutting plane substantially parallel to and between the opposed suction cups, whereby the slab may be cut into two layers and during the cutting operation the opposed suction cups and said supporting means prevent relative movement of the partly-cut layers.

2. A stone-cutting saw as claimed in claim 1, and an upright support member on which said second vacuum cup is mounted which is hinged at its lower end to enable the vacuum cup to be moved towards or away from the surface of the slab when the slab is positioned between said first and second gripping means.

3. A stone-cutting saw as claimed in claim 2, wherein said upright support member is additionally articulated intermediate its length.

4. A stone-cutting saw as claimed in claim 2, wherein said second vacuum cup is movable along said support means, and means for clamping said vacuum cup at a desired position on said support member.

5. A stone-cutting saw as claimed in claim 1, and means for adjusting the position of the first-mentioned cup on the frame.

6. A stone-cutting saw as claimed in claim 1, wherein said first gripping means comprises a plurality of vacuum cups, a plurality of upright support members on which said plurality of cups are supported, said support members being disposed in parallel relation to said frame, and means for clamping each said vacuum cup in a desired position on its respective support member.

7. A stone-cutting saw as claimed in claim 2, and stop means to control the inward movement of said second vacuum cup.

8. A stone-cutting saw as claimed in claim 2, said lower end of said upright support member being hinged for vertical swinging movement about a horizontal axis, and means for supporting the lower edge of the slab at a level at least about as high as said axis.

* * * * *